June 5, 1928.
F. M. ARCHER
TOY CART
Filed May 6, 1926
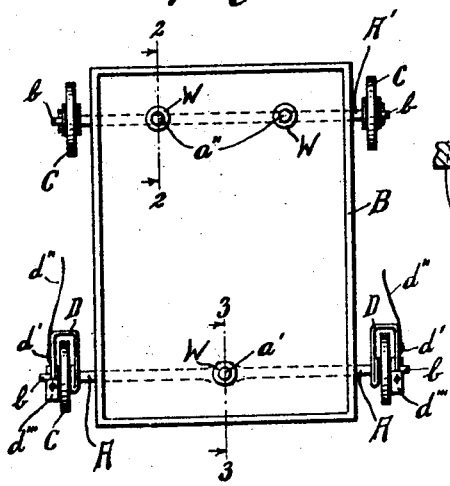
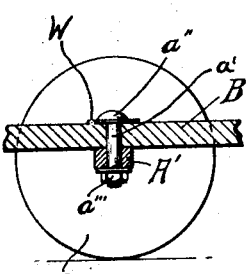
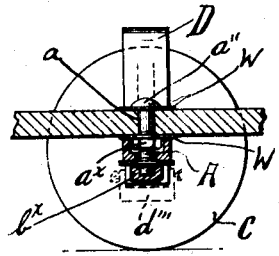
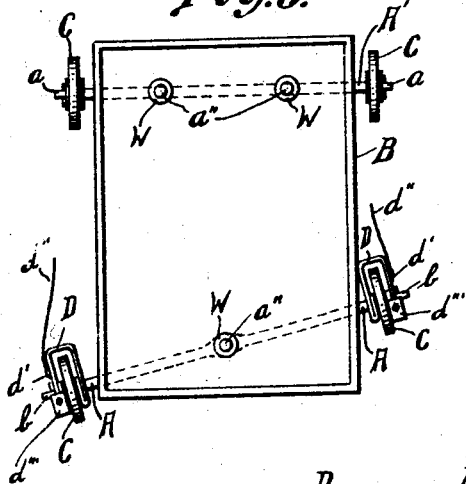
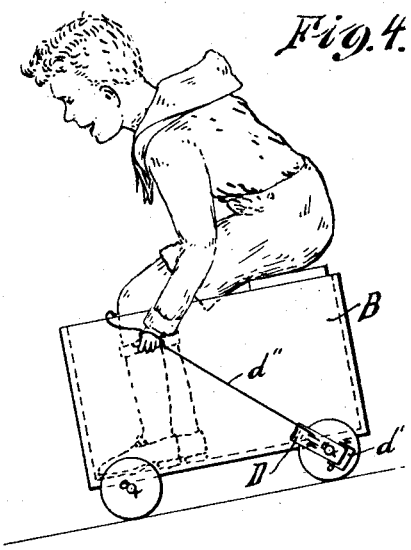
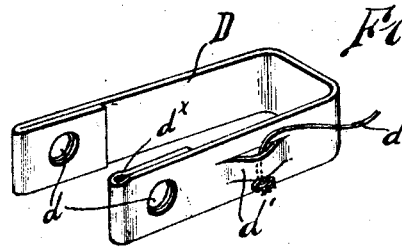
INVENTOR
Frank M. Archer
By Mitchell, Chadwick & Kent
ATTORNEYS Patented June 5, 1928.

1,672,553

UNITED STATES PATENT OFFICE.

FRANK M. ARCHER, OF BROOKLINE, MASSACHUSETTS, ASSIGNOR, BY MESNE ASSIGNMENTS, TO THE MOXIE COMPANY, OF BOSTON, MASSACHUSETTS, A CORPORATION OF MASSACHUSETTS.

TOY CART.

Application filed May 6, 1926. Serial No. 107,255.

My invention is a toy cart of the simplest character, in which the upper sector of the supporting wheels is alongside the body of the cart, so that, in the case of the steering wheels, which are carried on the ends of a pivoted axle, the rims of the wheels might be brought into contact with the body of the cart, with a sudden braking effect, when the steering axle is turned to steer, unless equipped in accordance with my invention.

In the drawings:

Figure 1 is a plan view of the cart;

Figures 2 and 3 are sectional details on an enlarged scale on lines 2—2 and 3—3 of Figure 1;

Figure 4 is a side elevation of the cart;

Figure 5 is like Figure 1, but showing steering action;

Figure 6 is a perspective detail on an enlarged scale of the draft-shield;

Figure 7 is a similar detail of the counterweight.

The object of my invention is to provide, at the lowest possible cost, a child's cart, which can not only be dragged but safely used for coasting purposes, having steering capacity, but limited as to amplitude, to prevent any braking effect as a result of steering or any too sudden change of direction, tending to upset the cart.

To this end I provide a running gear made up of two axles, A, A', the body B of the cart serving the purpose of spacing the two axles apart. These axles are provided at their ends with suitable cylindrical bearings, $b$, upon which the hubs of wheels C may have rotatable bearing and upon each of the four bearings I mount a wheel, the wheels being usually formed of wooden discs of small diameter.

The body B of the cart may be formed of any box or case of suitable size to the under side of which at one end is fixed an axle A' by a pair of small bolts, $a'$, provided with a head $a''$ and nut $a'''$ and preferably having wide washers, $w$, between the head $a''$ and the bottom of the box and the nut $a'''$ and the bottom of the box, to transmit the strain widely.

At the other end of the box the axle A is pivotally secured by a headed, threaded bolt, $a$, which is provided with wide washers, $w$, and is held in perpendicular relation to the bottom of the body B by the nut $a^x$. Upon this secured bolt the axle A is placed the bolt passing through an aperture in the axle and the lower or free end of the bolt is capped with a crown nut, $b^x$, the upper surface of the axle being recessed to receive the nut $a^x$.

The width of the body B should be such that the ends of the axle A, with its wheels C may project a sufficient distance to permit of a small arc of turning of the axle before the edge of the wheel approaches the body B.

Mounted upon each end of the axle A and straddling the wheels C is a metal draft-shield D, of a narrow U shape, having apertures, $d$, at each end of suitable diameter to pass over the bearing $b$. Near one aperture, $d$, a strip of the metal is separated by parallel slits and pressed out to form a loop, $d'$, and at the extreme end of this leg of the shield member is secured a counterweight $d'''$ which normally holds the shield vertical and is held in place by a cotter pin passing through a loop $d^x$ in the part D. In the assembly, this shield is straddled on the wheel, one leg being on one side and the other leg on the other, the apertures $d$ coinciding with the axial aperture in the wheel, and the two legs are passed onto the bearing $b$, with the wheel C, the side of D carrying the loop $d'$ and the counterweight $d'''$, being on the outer side of the wheel. This loop $d'$ is designed to receive the end of a cord $d''$ by means of which the axle may be turned for steering purposes and the loop is placed upon the outer side of the wheel in order to give the most efficient leverage to the steersman.

In the drawings I have illustrated (Figure 4) a small cart and have shown the figure seated therein steering by means of the rear axle, as the natural position of the hands in such a case is such that the cord $d''$ draws more nearly in the plane of movement of the pivoted axle than would be the case if the position of the steersman were reversed, and the steering control is therefore easier and more powerful.

With a vehicle of short wheel base it is obviously desirable that changes of direction, while in use as a coaster, should not be too sudden, nor too ample, and also that sudden retardation of one or more of the wheels of the vehicle would be likely to cause sudden and incalculable changes of direction and erratic movement and consequent spills. It is the object and function of the element D, not merely to act as a draft device in hauling the cart, but also to prevent contact of the edges of the steering wheels with the sides of the vehicle, as the steering axle is turned. As the axle is turned by a draft upon one reach of the steering cord, the edge of the wheel upon that end of the axle which is pulled is swung toward the side of the vehicle, but the shield D is between the edge of the wheel and the side of the vehicle and first engages the side and stops the turning motion of the axle.

I claim:

1. In a toy cart, a body; a fixed axle beneath the body at one end; wheels upon the ends of the fixed axle; a centrally pivoted axle beneath the body at the other end; wheels upon the ends of the pivoted axle; and draft and guard elements of U-shape carried by the pivoted axle, straddling the wheels, the outside leg of each guard provided with a rope attaching loop, all organized and operating substantially as described.

2. A draft and guard element for a toy cart, comprising a U-shaped metal strap having axle apertures adjacent its ends, one leg carrying a draft loop.

3. A pivot element, comprising a headed and threaded bolt to pass through a pivot sustaining part; a threaded clamping nut upon the bolt, cooperating with the head to hold the pivot bolt; an axle recessed upon its upper side to receive the clamping nut and having an aperture central of the recess to receive the bolt; and a second nut below the axle, to form a stop to retain the axle.

Signed at Boston, Massachusetts this 4th day of May, 1926.

FRANK M. ARCHER.